(12) United States Patent
Jeong et al.

(10) Patent No.: US 9,959,211 B2
(45) Date of Patent: May 1, 2018

(54) MEMORY CONTROL UNIT FOR CONTROLLING SEMICONDUCTOR MEMORY DEVICE AND DATA STORAGE APPARATUS INCLUDING THE SAME

(71) Applicant: SK hynix Inc., Gyeonggi-do (KR)

(72) Inventors: Jae Hyeong Jeong, Gyeonggi-do (KR);
Joong Hyun An, Gyeonggi-do (KR);
Kwang Hyun Kim, Gyeonggi-do (KR);
Jae Woo Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 181 days.

(21) Appl. No.: 14/857,466

(22) Filed: Sep. 17, 2015

(65) Prior Publication Data

US 2017/0010960 A1    Jan. 12, 2017

(30) Foreign Application Priority Data

Jul. 9, 2015  (KR) ......................... 10-2015-0097840

(51) Int. Cl.
*G06F 12/08* (2016.01)
*G06F 12/02* (2006.01)
*G06F 12/0875* (2016.01)

(52) U.S. Cl.
CPC ...... *G06F 12/0875* (2013.01); *G06F 12/0246* (2013.01); *G06F 2212/1041* (2013.01); *G06F 2212/452* (2013.01); *G06F 2212/7202* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 5,463,743 | A * | 10/1995 | Galloway | G06F 13/126 710/105 |
| 6,832,273 | B2 * | 12/2004 | Ray | G06F 9/4411 710/10 |
| 8,736,623 | B1 * | 5/2014 | Lew | G06F 3/14 345/522 |

FOREIGN PATENT DOCUMENTS

KR  1020080004875   1/2008
WO  WO 98/12630   * 3/1998

* cited by examiner

*Primary Examiner* — Gary W. Cygiel
(74) *Attorney, Agent, or Firm* — IP & T Group LLP

(57) ABSTRACT

The memory control unit includes a descriptor fetch block suitable for fetching a descriptor from a volatile memory; an instruction fetch block suitable for fetching an instruction set from an instruction memory through an address information, wherein the instruction fetch block obtains the address information from the instruction memory through an index information included in the fetched descriptor; and a memory instruction generation block suitable for generating a memory instruction by combining a descriptor parameter value included in the fetched descriptor to the fetched instruction set.

17 Claims, 16 Drawing Sheets

FIG.5

INSTRUCTION TABLE

| INSTRUCTION | INFORMATION | OPERATION CODE (OPCODE) |
|---|---|---|
| COMMAND | READ COMMAND CODE 1 | 1 |
| | READ COMMAND CODE 2 | 2 |
| | WRITE COMMAND CODE 1 | 3 |
| | ⋮ | ⋮ |
| | STATUS CONFIRM COMMAND CODE | n |
| ADDRESS | DSC_PRM | n+1 |
| WRITE CONTROL SIGNAL | DSC_PRM | n+2 |
| READ CONTROL SIGNAL | DSC_PRM | n+3 |
| DELAY | DSC_PRM | n+4 |
| | ⋮ | |

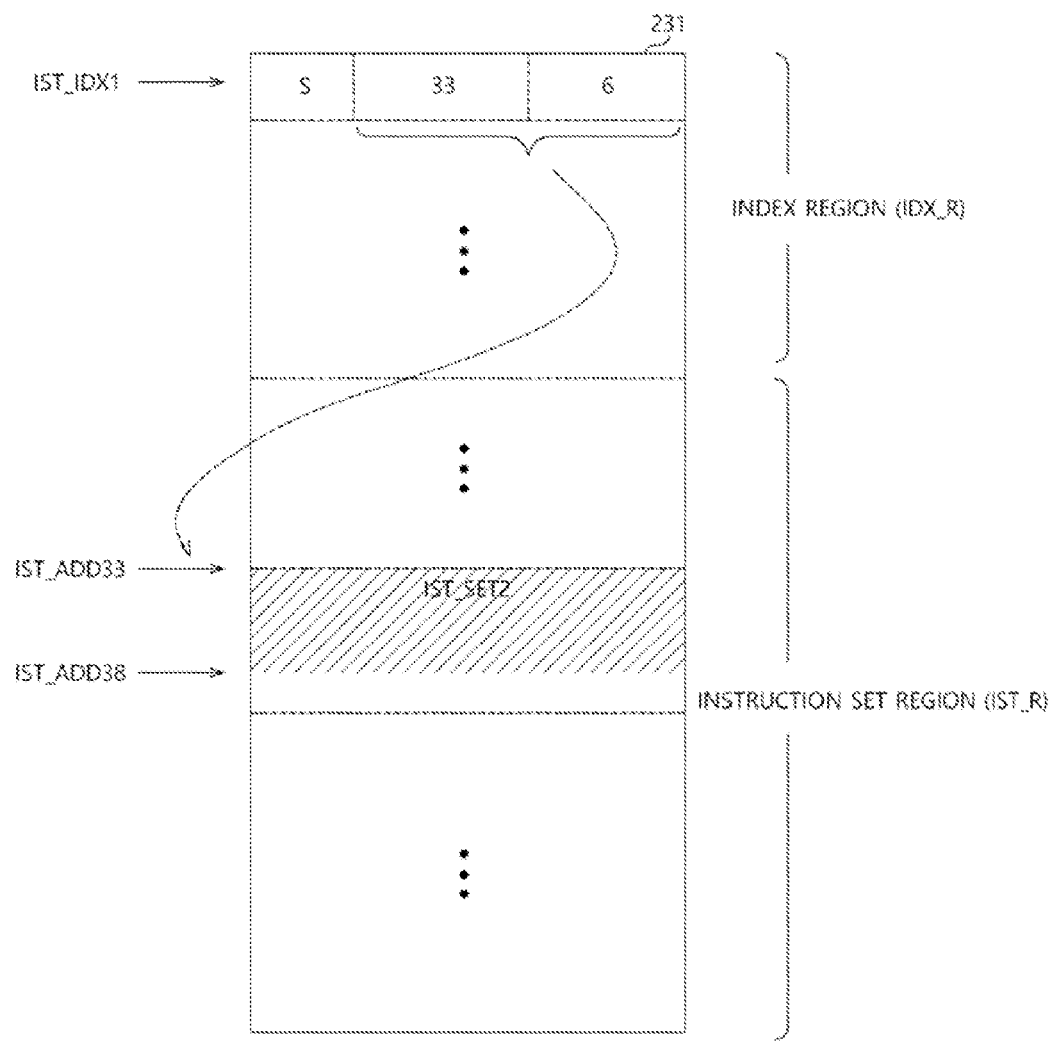

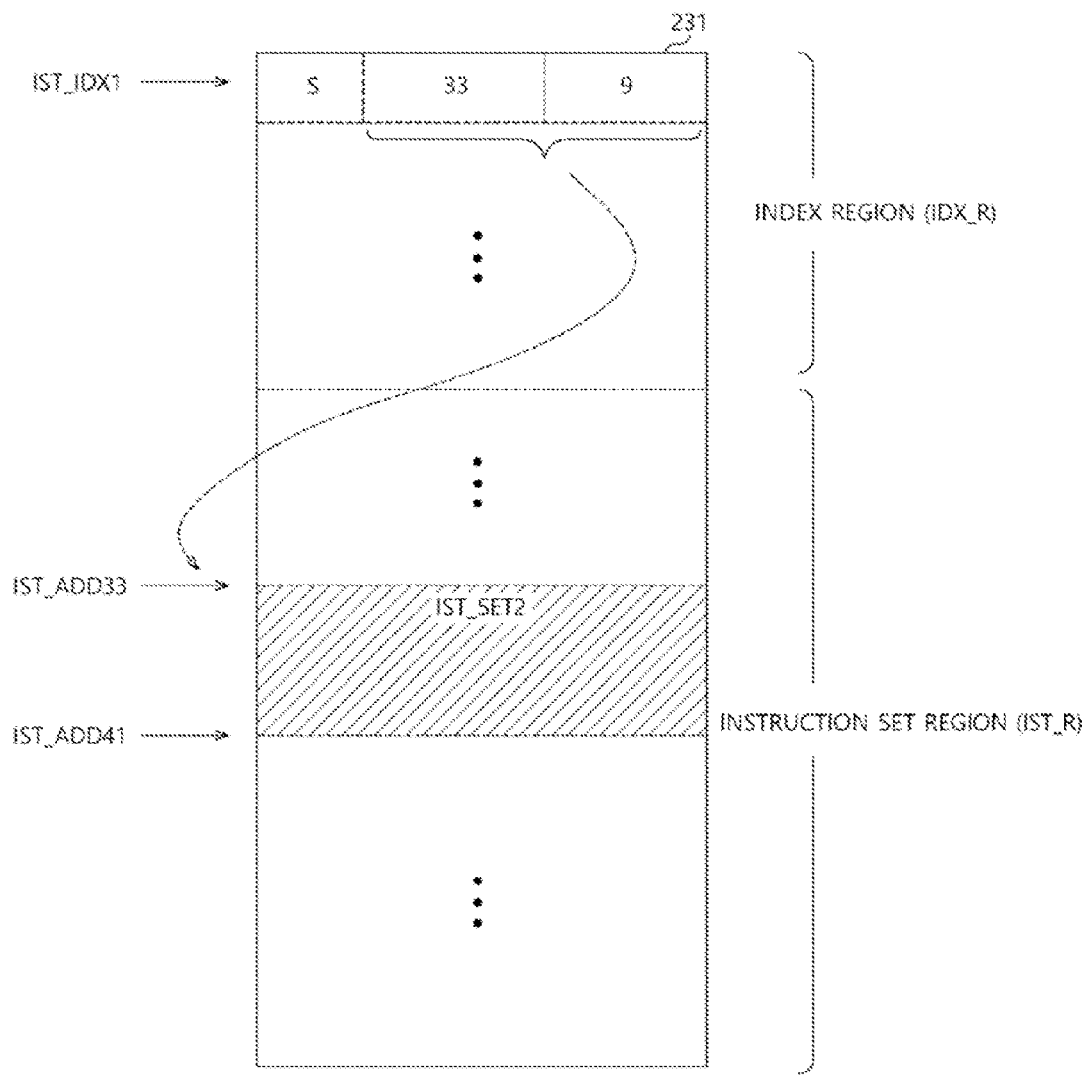

MEMORY CONTROL UNIT FOR CONTROLLING SEMICONDUCTOR MEMORY DEVICE AND DATA STORAGE APPARATUS INCLUDING THE SAME

CROSS-REFERENCES TO RELATED APPLICATION

This application claims priority under 35 U.S.C. 119(a) to Korean application No. 10-2015-0097840, filed on Jul. 9, 2015, in the Korean intellectual property Office, which is incorporated by reference in its entirety.

BACKGROUND

1. Technical Field

Various embodiments of the inventive concept relate to a data storage apparatus, and more particularly, to a memory control unit capable of efficiently generating a control signal to be provided to a memory device and a data storage apparatus including the same.

2. Related Art

In recent years, the paradigm for the computing environment has switched to ubiquitous computing, where semiconductor devices are being used anytime and anywhere. Thus, the use of portable electronic apparatuses such as portable phones, digital cameras, and laptop computers has increased rapidly. Portable electronic apparatuses generally employ data storage apparatuses using memory devices. The data storage apparatuses are used to store data for the portable electronic apparatuses.

The data storage apparatuses using the memory devices have no moving parts and are stable, robust, have fast information access rates, and lower power consumption. Data storage apparatuses having such advantages include universal serial bus (USB) memory devices, memory cards having various interfaces, universal flash storage (UFS) devices, and solid state drives (SSD).

SUMMARY

One or more exemplary embodiments are related to a memory control unit capable of generating a control signal to be provided to a memory device, and a data storage apparatus including the same.

According to an embodiment, there is provided a memory control unit. The memory control unit may include a descriptor fetch block suitable for fetching a descriptor from a volatile memory; an instruction fetch block suitable for fetching an instruction set from an instruction memory through address information, wherein the instruction fetch block obtains the address information from the instruction memory through an index information included in the fetched descriptor; and a memory instruction generation block suitable for generating a memory instruction by combining a descriptor parameter value included in the fetched descriptor to the fetched instruction set.

According to an embodiment, there is provided a data storage apparatus. The data storage apparatus may include: a nonvolatile memory device; a control unit suitable for generating a descriptor and storing the descriptor in a volatile memory; and a memory control unit including an instruction memory storing an instruction set, and suitable for obtaining address information, which corresponds to an instruction set to be fetched from the instruction memory, from the instruction memory through an index information included in the descriptor.

According to an embodiment, memory capacity for storing an instruction, which is a kind of command for generating a control signal to be provided to a memory device, may be reduced.

These and other features, aspects, and embodiments are described below in the section entitled "DETAILED DESCRIPTION".

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIGS. 4 and 5 are schematic diagrams illustrating an instruction set stored in an instruction memory shown in FIG. 1;

FIG. 9 is a schematic diagram exemplarily illustrating a single index type of instruction memory address information according to an exemplary embodiment;

FIGS. 10 to 12 are schematic diagrams illustrating a method of directly acquiring address information according to an embodiment of the inventive concept;

FIG. 13 is a schematic diagram exemplarily illustrating a multi index type of instruction memory address information according to an embodiment of the inventive concept;

DETAILED DESCRIPTION

Exemplary embodiments are described herein with reference to schematic cross-sectional illustrations of exemplary embodiments (and intermediate structures). The exemplary embodiments should not be construed as being limited to the particular shapes illustrated herein. These inventive concepts may be embodied in different forms and it will be appreciated by those of ordinary skill in the art that changes may be made in without departing from the principles and spirit of the inventive concept, the scope of which is defined by the claims and their equivalents.

The terminology used herein to describe embodiments of the invention is not intended to limit the scope of the invention. It is also noted that in this specification, "connected/coupled" refers to one component not only directly coupling another component but also indirectly coupling another component through an intermediate component. In addition, a singular form may include a plural form, and vice versa, as long as it is not specifically mentioned. The articles "a," "an," and "the" are singular in that they have a single referent; however, the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in more detail with reference to the accompanying drawings.

Figure 1:
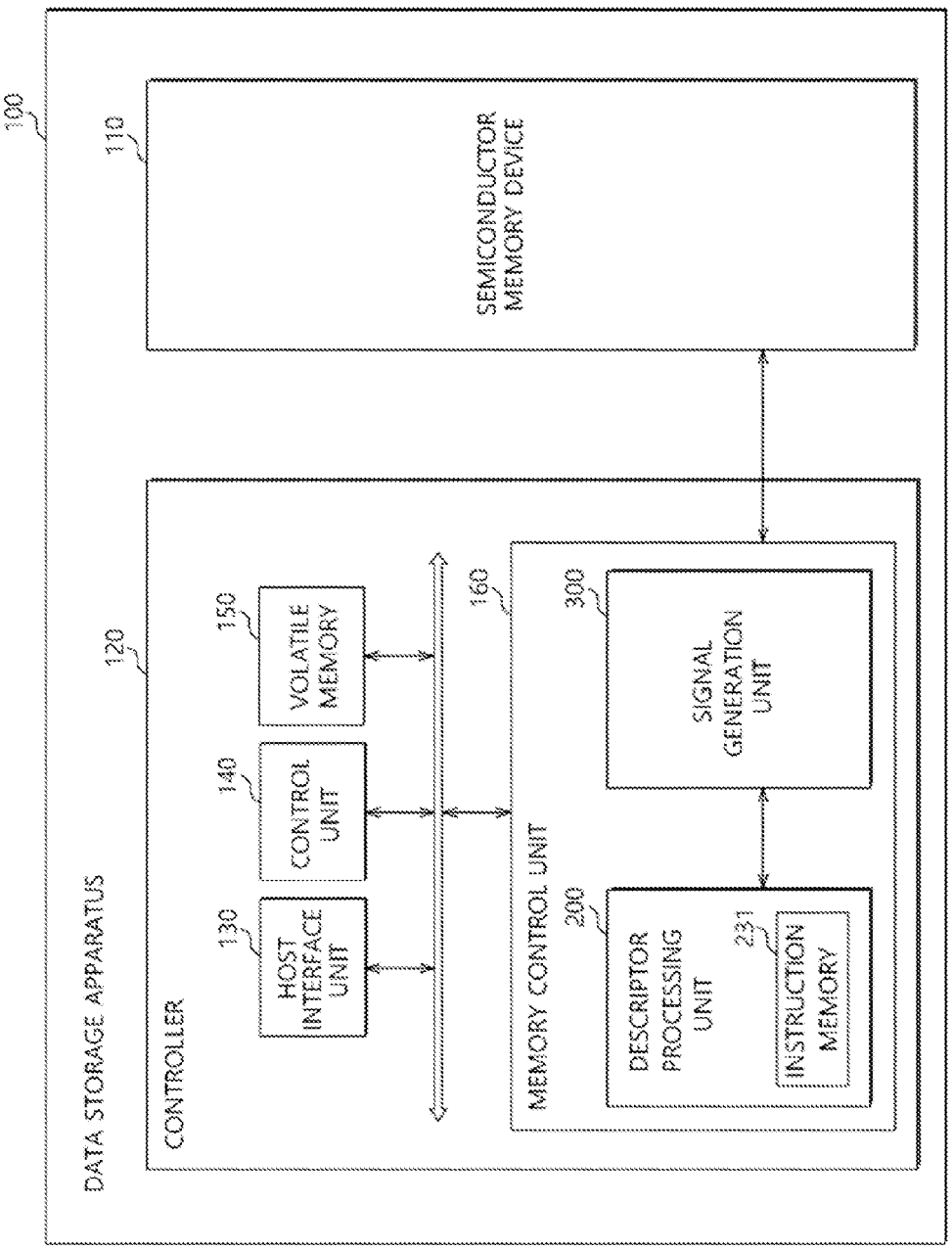
FIG. 1 is a block diagram exemplarily illustrating a data storage apparatus according to an embodiment of the inventive concept.

FIG. 1 is a block diagram exemplarily illustrating a data storage apparatus 100 according to an embodiment. The data storage apparatus 100 may store data accessed by a host apparatus (not shown) such as a portable phone, an MP3 player, a laptop computer, a desktop computer, a game machine, a television (TV), or an in-vehicle infotainment system. The data storage apparatus 100 may be a memory system.

The data storage apparatus 100 may be manufactured with any one of various types of storage apparatuses according to an interface protocol coupled to the host apparatus. For example, the data storage apparatus 100 may be configured as any one of various types of storage apparatuses such as a SSD, a multimedia card (MMC), embedded MMC (eMMC), reduced-size MMC (RS-MMC), or micro-MMC type of MMC, a secure digital (SD), mini-SD, or micro-SD type of SD card, a universal serial bus (USB) storage apparatus, a universal flash storage (UFS) apparatus, a personal computer memory card international association (PCMCIA) card type of storage apparatus, a peripheral component interconnection (PCI) card type of storage apparatus, a PCI-express (PCI-E) card type of storage apparatus, a compact flash (CF) card, a smart media card, and a memory stick.

The data storage apparatus 100 may be manufactured with any one of various types of packages. For example, the data storage apparatus 100 may be manufactured with any one of various types of packages such as a package on package (POP), a system in package (SIP), a system on chip (SOC), a multichip package (MCP), a chip on board (COB), a wafer-level fabricated package (WFP), and a wafer-level stack package (WSP).

The data storage apparatus 100 may include a semiconductor memory device 110 and a controller 120.

The semiconductor memory device 110 may serve as a storage medium of the data storage apparatus 100. The semiconductor memory device 110 may be configured of any one of various types of nonvolatile memory devices such as a NAND flash memory device, a NOR flash memory device, a ferroelectric random access memory (FRAM) using a ferroelectric capacitor, a magnetic RAM (MRAM) using a tunneling magnetoresistive (TMR) layer, a phase-change RAM (PCRAM) using a chalcogenide alloy, and a resistive RAM (RERAM) using a transition metal oxide. The FRAM, MRAM, PCRAM, and RERAM may be a kind of nonvolatile RAM device which may be randomly accessible to a memory cell. The semiconductor memory device 110 may be configured of a combination of a NAND flash memory device and the above-described various types of nonvolatile RAM devices. Hereinafter, the nonvolatile memory device may be the semiconductor memory device 110.

The controller 120 may control overall operations of the data storage apparatus 100 through driving of firmware or software loaded into a volatile memory 150 therein. The controller 120 may decode and drive a code type of instruction or algorithm such as firmware or software. The controller 120 may be implemented in a hardware form or in a combined form of software and hardware.

The controller 120 may include a host interface unit 130, a control unit 140, the volatile memory 150, and a memory control unit 160. The memory control unit 160 may refer to a memory interface unit. The memory control unit 160 may include a descriptor processing unit 200 and a signal generation unit 300. Although not shown in FIG. 1, the memory control unit 160 may further include an error correction code (ECC) circuit suitable for detecting an error of data read out from the nonvolatile memory device 110 and correct the detected error.

The host interface unit 130 may perform interfacing between a host apparatus (not shown) and the data storage apparatus 100 according to a protocol of the host apparatus. For example, the host interface unit 130 may communicate with the host apparatus through any one of a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-E protocol.

The control unit 140 may analyze and process a request input from the host apparatuses. The control unit 140 may control overall operation of the controller 120 in response to the request of the host apparatus. The control unit 140 may control operations of functional blocks inside the controller 120 according to firmware or software for driving the data storage apparatus 100.

The volatile memory 150 may store the firmware or software driven through the control unit 140. The volatile memory 150 may be suitable for storing data required to drive the firmware or software. That is, the volatile memory 150 may serve as a working memory of the control unit 140. The volatile memory 150 may be suitable for temporarily storing data to be transmitted from the host apparatus to the nonvolatile memory device 110 or data to be transmitted from the nonvolatile memory device 110 to the host apparatus. That is, the volatile memory 150 may serve as a data buffer memory.

The memory control unit 160 may control the nonvolatile memory device 110 according to a descriptor generated through the control unit 140. The descriptor may be a work order describing the work to be processed through the memory control unit 160 in order to control the nonvolatile memory device 110. The descriptor will be described in detail later.

The memory control unit 160 may generate and drive control signals to be provided to the nonvolatile memory device 110 according to the descriptor. The control signals may include a command and an address signal for controlling the nonvolatile memory device 110. The memory control unit 160 may provide data, which is buffered in the volatile memory 150, to the nonvolatile memory device 110 according to the descriptor.

The descriptor processing unit 200 may fetch the descriptor from a descriptor buffer memory, for example, from a descriptor storage region of the volatile memory 150. The descriptor processing unit 200 may fetch an instruction set, which may be recognizable by the signal generation unit 300, from an instruction memory 231 based on the descriptor in an index manner. The descriptor processing unit 220 may generate a memory instruction for generation of a control signal for controlling the nonvolatile memory device 110 based on the instruction set and parameters of the descriptor. The descriptor processing unit 200 may provide the generated memory instruction to the signal generation unit 300. The configuration and operation of the descriptor processing unit 200 will be described in detail later.

The signal generation unit 300 may generate a control signal to be provided to the nonvolatile memory device 110 based on the memory instruction provided from the descriptor processing unit 200. The signal generation unit 300 may transfer data from the descriptor processing unit 200 to the nonvolatile memory device 110. The signal generation unit 300 may transfer data and status information from the nonvolatile memory device 110 to the descriptor processing unit 200.

The descriptor and the instruction set processed through the descriptor processing unit 200 will be described in detail with reference to FIGS. 2 to 7.

Figure 2:
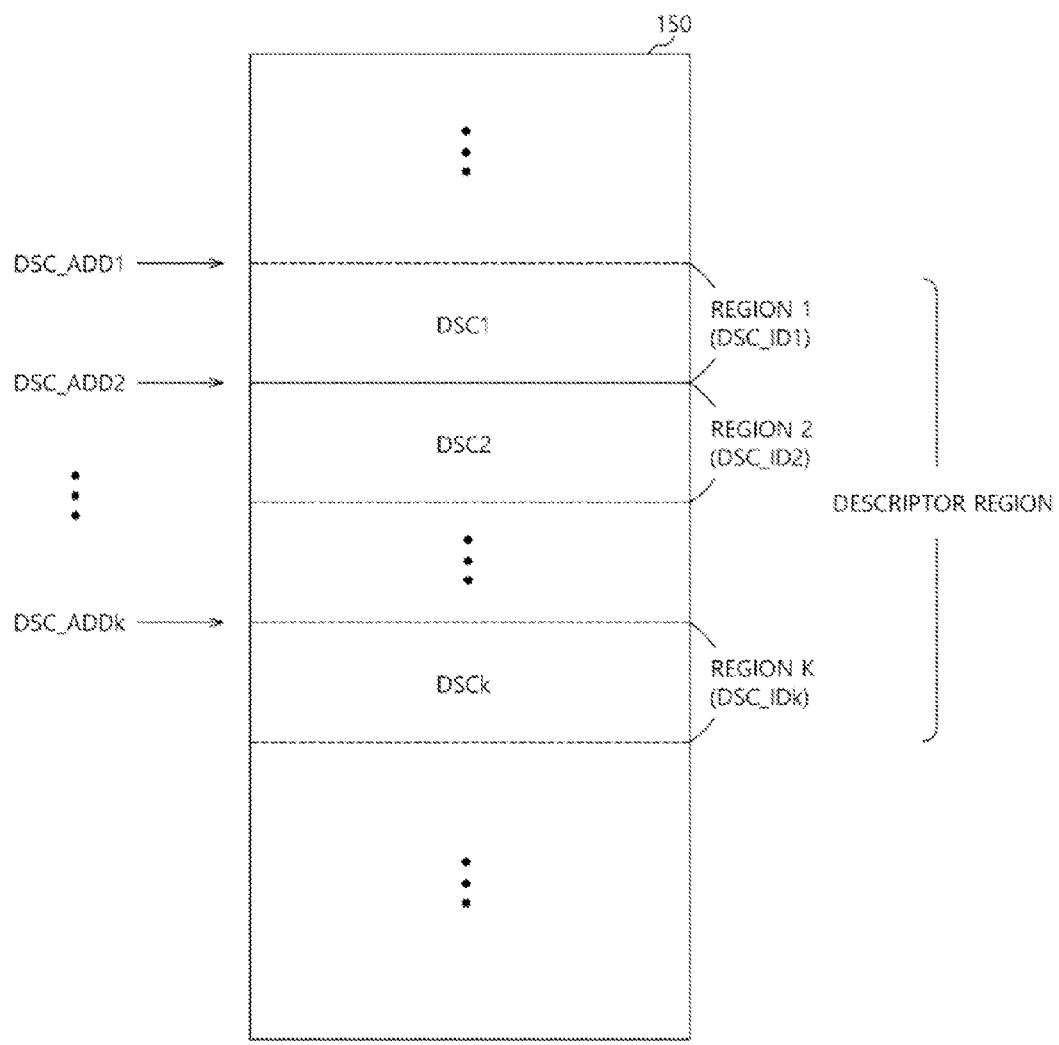
FIGS. 2 and 3 are schematic diagrams illustrating a descriptor stored in a volatile memory shown in FIG. 1.
Figure 3:
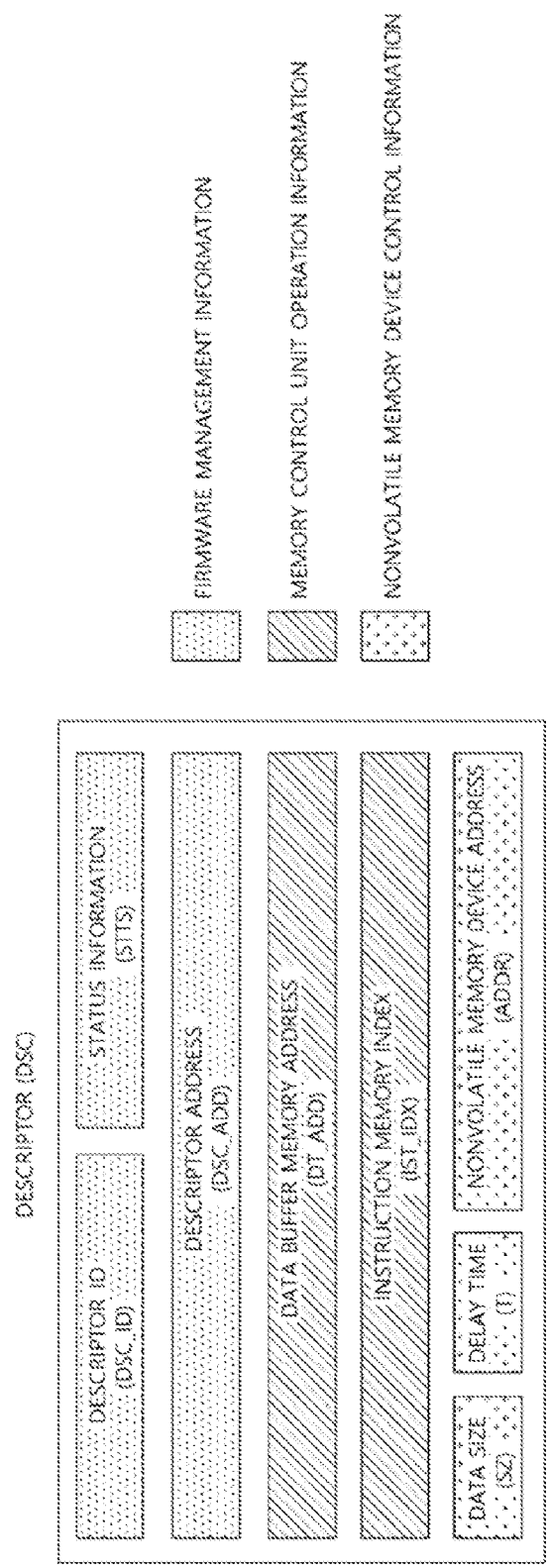

FIGS. 2 and 3 are schematic diagrams illustrating the descriptor stored in the volatile memory 150 shown in FIG. 1. The control unit 140 may generate the descriptor DSC describing the work to be processed through the memory control unit 160 in order to control the nonvolatile memory device 110. The control unit 140 may assign a single identification (ID) to each descriptor DSC when generating the descriptor DSC. The control unit 140 may store the generated descriptor DSC in a descriptor buffer memory, that is, a descriptor region of the volatile memory 150.

A descriptor ID DSC_ID may be assigned according to where the descriptor DSC is stored. For example, first to k-th descriptor IDs DSC_ID1 to DSC_IDk may be assigned to first to k-th descriptors DSC1 to DSCk stored in first to k-th descriptor regions 1 to k, respectively.

That is, the descriptor ID DSC_ID may correspond to a descriptor region storing the descriptor DSC. The descriptor ID DSC_ID may correspond to a descriptor address DSC_ADD of the descriptor region of the volatile memory 150 storing a corresponding descriptor DSC. For example, the first to k-th descriptor IDs DSC_ID1 to DSC_IDk may correspond to first to k-th descriptor addresses DSC_ADD1 to DSC_ADDk, respectively.

The descriptors DSC may be generated in the control unit 140, and may be referred to and decoded by the memory control unit 160. Thus, as illustrated in FIG. 3, the descriptor DSC may comprise a field of information ("FIRMWARE MANAGEMENT INFORMATION") managed through the control unit 140, a field of information ("MEMORY CONTROL UNIT OPERATION INFORMATION") for the operation of the memory control unit 160, and a field of ("NONVOLATILE MEMORY DEVICE CONTROL INFORMATION") information for controlling the nonvolatile memory device 110 through the memory control unit 160.

The information ("FIRMWARE MANAGEMENT INFORMATION") managed through the control unit 140 may include the descriptor ID DSC_ID assigned to a corresponding descriptor DSC when the corresponding descriptor DSC is generated, and status information Si IS which is reported to the control unit 140 as a processing result of the descriptor DSC or is referred to by the control unit 140. Also, the information ("FIRMWARE MANAGEMENT INFORMATION") managed through the control unit 140 may include a descriptor address DSC_ADD.

The information ("MEMORY CONTROL UNIT OPERATION INFORMATION") for the operation of the memory control unit 160 may include an address DT_ADD of a data buffer memory in which data to be stored in the nonvolatile memory device 110 is buffered according to control of the memory control unit 160 or in which data read out from the nonvolatile memory device 110 is buffered according to control of the memory control unit 160. For example, the address of the data buffer memory may indicate an address of the data buffer region of the volatile memory 150.

Also, the information ("MEMORY CONTROL UNIT OPERATION INFORMATION") for the operation of the memory control unit 160 may include an instruction memory index IST_IDX, which is an address of the instruction set IST_SET stored in the instruction memory 231. The instruction memory index IST_IDX will be described in detail later.

The information ("NONVOLATILE MEMORY DEVICE CONTROL INFORMATION") for controlling the nonvolatile memory device 110 through the memory control unit 160 may include a size SZ of data to be stored in the nonvolatile memory device 110 or to be read out from the nonvolatile memory device 110. Also, the information ("NONVOLATILE MEMORY DEVICE CONTROL INFORMATION") for controlling the nonvolatile memory device 110 through the memory control unit 160 may include a delay time T for an internal operation of the nonvolatile memory device (for example, a programming operation or a sensing operation for a memory cell). Further, the information ("NONVOLATILE MEMORY DEVICE CONTROL INFORMATION") for controlling the nonvolatile memory device 110 through the memory control unit 160 may include an address ADDR to be provided to the nonvolatile memory device 110.

A descriptor parameter DSC_PRM means extracted or acquired information from the descriptor DSC. For example, the size SZ of data, the delay time T and the address ADDR, may be used as a descriptor parameter DSC_PRM.

Although not shown in the drawings, the information ("NONVOLATILE MEMORY DEVICE CONTROL INFORMATION") for controlling the nonvolatile memory device 110 through the memory control unit 150 may further include timing information of a specific command, a signal and the like for controlling the nonvolatile memory device 110.

Figure 4:
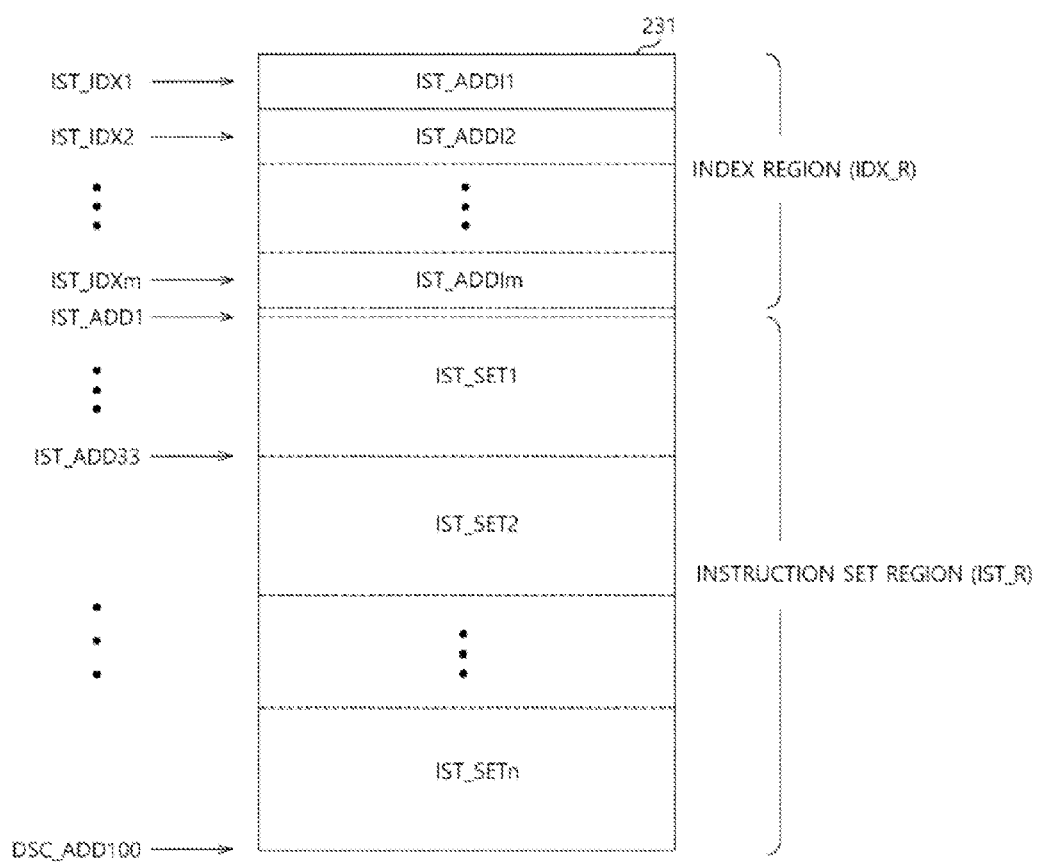

FIGS. 4 and 5 are schematic diagrams illustrating an instruction set stored in the instruction memory 231 shown in FIG. 1.

During boot up of the data storage apparatus 100, various types of instruction sets IST_SET1 to IST_SETn may be loaded into an instruction set region of the instruction memory 231. Hereinafter, a single instruction set. IST_SET will representatively indicate one of the various instruction sets IST_SET1 to IST_SETn as an example. The instruction set IST_SET may represent a control procedure for controlling the nonvolatile memory device 110 described. The instruction set IST_SET may include a control signal representing the control procedure of the nonvolatile memory device 110 for the control of the nonvolatile memory device 110.

Referring to FIG. 4, the instruction sets IST_SET1 to IST_SETn may be fetched through a two-staged process of accessing an index region IDX_R and accessing an instruction set region IST_R. The access to the index region IDX_R may be made through instruction memory indexes IST_IDX1 to IST_IDXm included in the descriptor DSC. The index region IDX_R may store the instruction memory addresses information IST_ADDI to IST_ADDIm. For example, through the access to the index region IDX_R, instruction memory addresses information IST_ADD1 to IST_ADD100 may be acquired among the instruction memory addresses information IST_ADDI to IST_ADDIm. The access to the instruction set region IST_R may be made through the acquired instruction memory addresses IST_ADD1 to IST_ADD100. For example, through the access to the instruction set region IST_R, the instruction sets IST_SET1 to IST_SETn may be acquired from the instruction memory 231.

The two-staged access process to the instruction memory 231 for the fetch of the instruction sets IST_SET1 to IST_SETn through the instruction memory indexes IST_IDX1 to IST_IDXm and the instruction memory addresses information IST_ADDI to IST_ADDIm may be referred to as an index method. The operation of fetching the instruction sets IST_SET1 to IST_SETn through the index method may be performed through an instruction fetch block illustrated in FIG. 8.

FIG. 5 exemplarily shows an instruction table of various instructions included in the instruction sets IST_SET1 to IST_SETn loaded in the instruction memory 231. The descriptor processing unit 220 may provide the signal generation unit 300 with the instruction set IST_SET in whole or in part as the memory instruction. The instruction set IST_SET may be a combination of the instructions. The instruction may indicate generation of one or more control signals to be provided to the nonvolatile memory device 110. As described above, the signal generation unit 300 may generate the control signal in response to the instruction of the instruction set IST_SET or the memory instruction provided from the descriptor processing unit 200. The instruction may be represented by an operation code OPCODE readable by the signal generation unit 300, and information for executing the operation code OPCODE may be added to the instruction.

For example, as shown in FIG. 5, a command instruction, an address instruction, a write control signal instruction, a read control signal instruction, and a delay instruction may be represented by the operation codes 1 to 'n+4', respectively. For example, the command instruction may indicate generation of a control signal for providing a command. The command instruction may represent a command code such as a read command code, a write command code, and a status confirm command code. The address instruction may indicate generation of a control signal for providing an address ADDR. The address instruction may represent the address ADDR acquired from a descriptor parameter DSC_PRM. The write control signal instruction may indicate generation of a control signal for inputting data. The write control signal instruction may represent a size SZ of the data. The data size SZ may be acquired from the descriptor parameter DSC_PRM. The read control signal instruction may indicate generation of a control signal for outputting data. The read control signal instruction may represent the data size SZ acquired from the descriptor parameter DSC_PRM. The delay instruction may indicate generation of a control signal for delaying each generation of the above described control signals by a delay time T during an internal operation of the nonvolatile memory device 110. The delay instruction may represent the delay time T acquired from the descriptor parameter DSC_PRM.

An instruction set IST_SET2 indicating a procedure for controlling the read operation of the nonvolatile memory device 110 will be exemplarily described.

Figure 6:
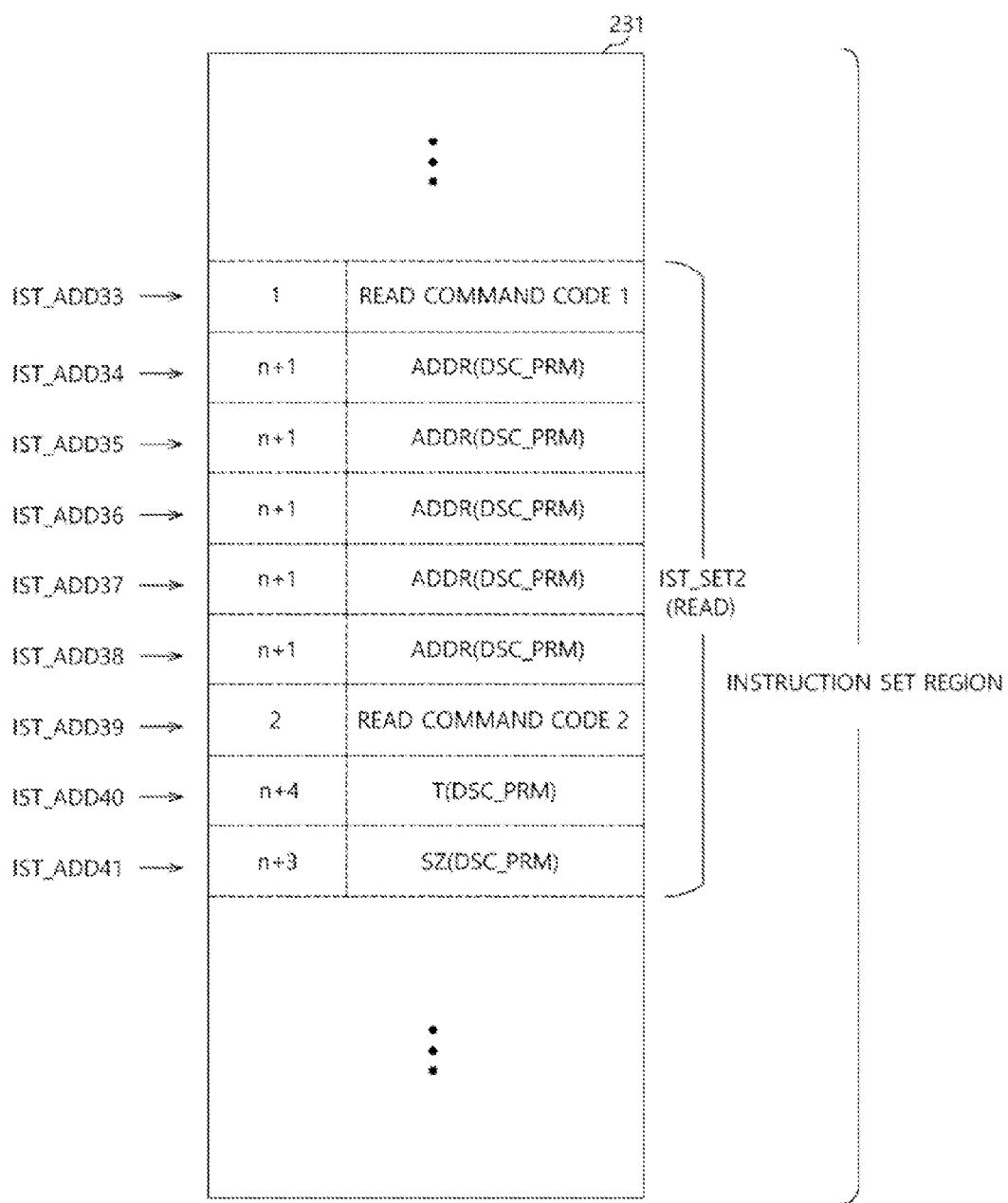
FIG. 6 is a diagram illustrating a read instruction set by a descriptor processing unit shown in FIG. 1.

FIG. 6 is a diagram illustrating the read instruction set IST_SET2 provided from the descriptor processing unit 200 shown in FIG. 1.

Figure 7:
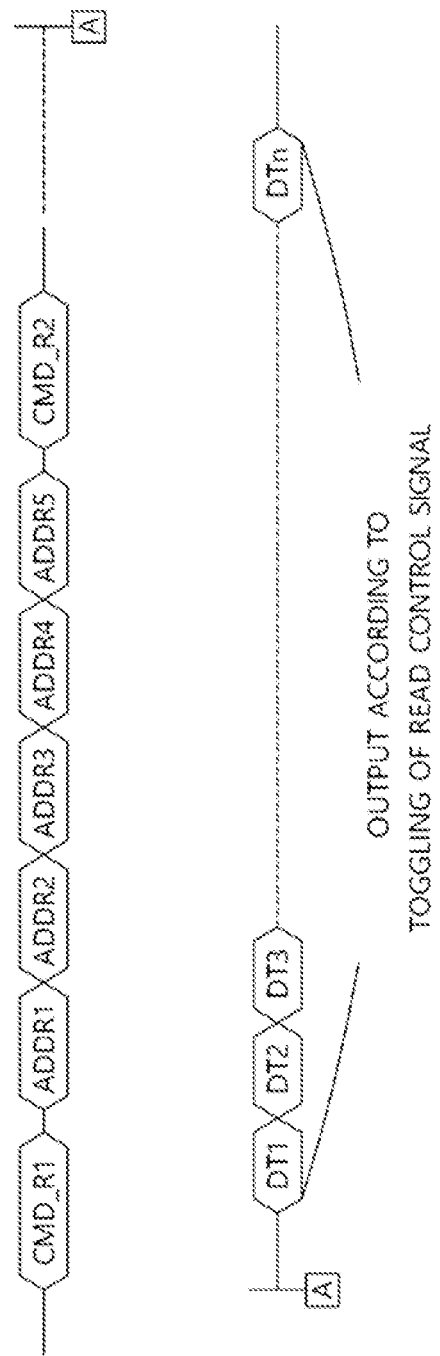
FIG. 7 is a timing diagram illustrating the flow of a control signal and data between a signal generation unit and a nonvolatile memory device in response to the read instruction set illustrated in FIG. 6.

FIG. 7 is a timing diagram illustrating a flow of a control signal and data between the signal generation unit 300 and the nonvolatile memory device 110 in response to the read instruction set illustrated in FIG. 6.

For the exemplary control procedure for controlling the read operation of the nonvolatile memory device 110, FIG. 7 exemplarily shows that the signal generation unit 300 in response to the read instruction set IST_SET2 provided from the descriptor processing unit 200 sequentially provides the nonvolatile memory device 110 with a first read command CMD_R1, five addresses ADDR1 to ADDR5, and a second read command CMD_R2, and then the toggling read control signal after a certain time elapsed. Through the toggling read control signal, data DT1 to DTn may be read out from the nonvolatile memory device 110. The first and second read commands CMD_R1 and CMD_R2, the five addresses ADDR1 to ADDR5, and the read control signal may correspond to first and second read command codes 1 and 2 of the command instruction, the address instruction, and the read control signal instruction of the read instruction set IST_SET2 shown in FIG. 6, respectively.

The signal generation unit 300 may generate the commands, addresses, and control signals according the instruction set IST_SET provided from the descriptor processing unit 200. For the generation of the commands, addresses and control signals for the read operation as exemplified in FIG. 7, referring to FIG. 6, the read instruction set IST_SET2 may comprise the operation code 1 representing the first read command code 1 of the command instruction, five operation codes "n+1" each representing the address ADDR (the descriptor parameter DSC_PRM) of the address instruction, an operation code 2 representing the second read command code 2 of the command instruction, an operation code "n+4" representing the delay time T of the delay instruction, and an operation code "n+3" representing the data size SZ of the read control signal instruction. The delay time T may indicate delay of the generation of the control signal by the amount of time for sensing a memory cell. The data size SZ may indicate data to be read out from the nonvolatile memory device 110.

As exemplified above, the instruction set IST_SET may comprise a combination of the instructions of the instruction memory 231 corresponding to control signals to be provided to the nonvolatile memory device 110, as shown in FIGS. 5 and 6. The instruction set IST_SET may be flexibly suitable for the control procedure of the nonvolatile memory device 110. No matter how the control procedure of the nonvolatile memory device 110 is defined during design of the data storage apparatus 100, the instruction set IST_SET may flexibly comprise the combination of the instructions according to the defined control procedure of the changed nonvolatile memory device 110, and thus the control signal for controlling the nonvolatile memory device 110 may be generated with flexibility.

Figure 8:
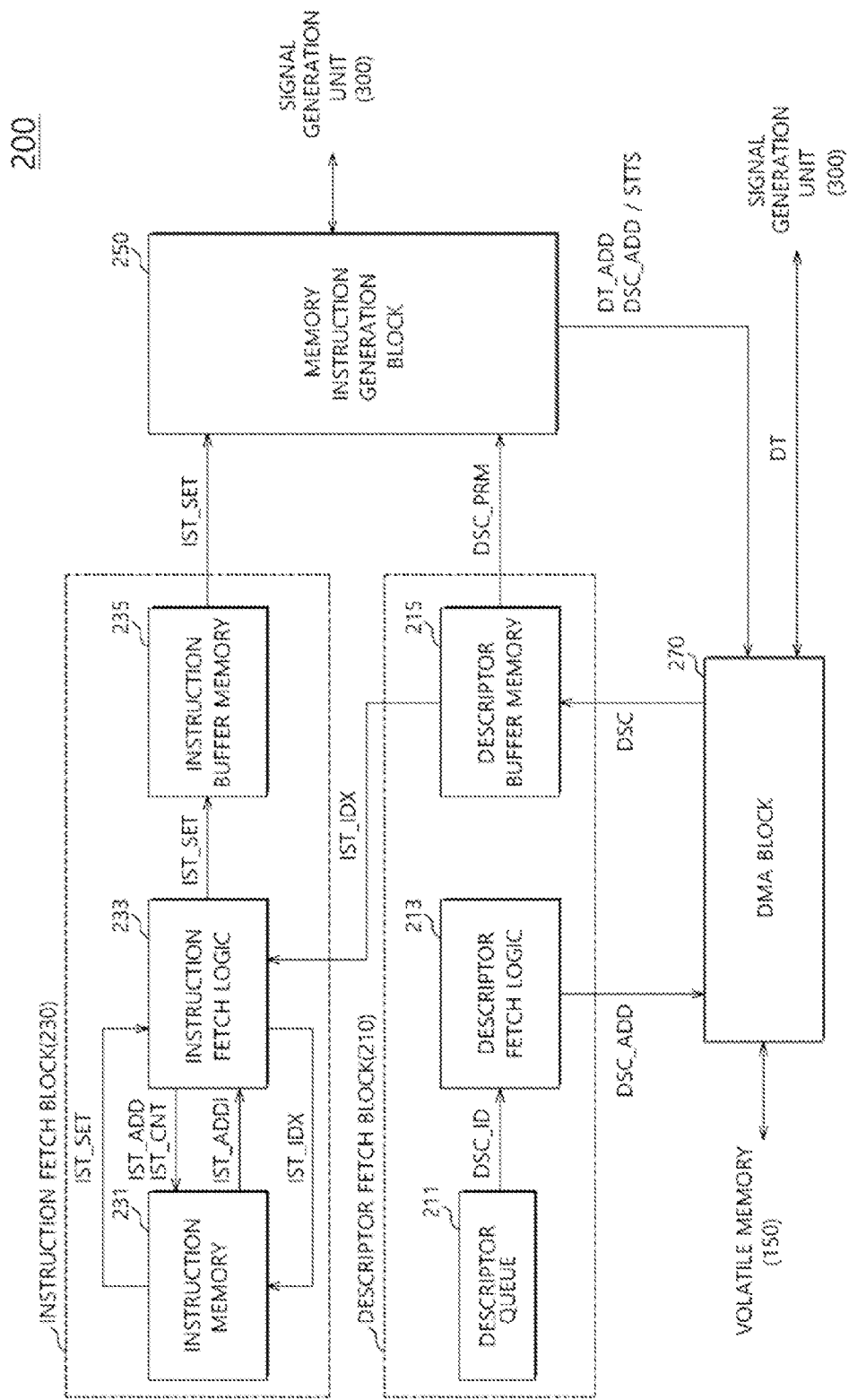
FIG. 8 is a block diagram exemplarily illustrating a descriptor processing unit shown in FIG. 1.

FIG. 8 is a block diagram exemplarily illustrating the descriptor processing unit 200 shown in FIG. 1.

Referring to FIGS. 1 to 8, the descriptor processing unit 200 may include a descriptor fetch block 210, the instruction fetch block 230, a memory instruction generation block 250, and a direct memory access (DMA) block 270.

The descriptor fetch block 210 may fetch the descriptor from the descriptor region of the volatile memory 150. The descriptor fetch block 210 may include a descriptor queue 211, a descriptor fetch logic 213, and a descriptor buffer memory 215.

The control unit 140 may enqueue the descriptor IDs DSC_ID1 to DSC_IDk in the descriptor queue 211.

For example, the descriptor fetch logic 213 may fetch the descriptor IDs DSC_ID1 to DSC_IDk stored in the descriptor queue 211 through the first-in-first-out (FIFO) manner. For another example, the descriptor fetch logic 213 may fetch the descriptor ID DSC_ID according to a priority assigned to each of the descriptor IDs DSC_ID1 to DSC_IDK.

As described with reference to FIG. 2, descriptor ID DSC_ID may correspond to the descriptor address DSC_ADD of the descriptor region of the volatile memory 150 storing a corresponding descriptor DSC. Accordingly, the descriptor fetch logic 213 may obtain the descriptor address DSC_ADD of the descriptor DSC, which is to be read out from the descriptor region of the volatile memory 150, from the fetched descriptor ID DSC_ID.

The descriptor fetch logic 213 may request the DMA block 270 to read out the descriptor DSC corresponding to the fetched descriptor ID DSC_ID by providing the obtained descriptor address DSC_ADD to the DMA block 270.

The DMA block 270 may read out the descriptor DSC stored in the descriptor region of the volatile memory 150 based on the descriptor address DSC_ADD provided from the descriptor fetch logic 213. The DMA block 270 may store the read descriptor DSC in the descriptor buffer memory 215. The descriptor DSC may include particular values of the descriptor parameter DSC_PRM, for example, particular values of the address ADDR, the data size SZ, and the delay time T.

The instruction fetch block 230 may fetch the instruction set IST_SET in whole or in part from the descriptor DSC stored in the descriptor buffer memory 215. The instruction fetch block 230 may include the instruction memory 231, an instruction fetch logic 233, and an instruction buffer memory 235.

The instruction fetch block 230 may fetch the instruction set IST_SET through the two-staged access process to the instruction memory 231 described above with reference to FIG. 4.

As described with reference to FIG. 3, the descriptor DSC may include the information for the instruction memory index IST_IDX. The instruction fetch logic 233 may refer to the instruction memory index IST_IDX of the descriptor DSC stored in the descriptor buffer memory 215 to fetch the instruction set IST_SET.

The instruction fetch logic 233 may access the index region IDX_R of the instruction memory 231 according to the instruction memory index ISD_IDX, and acquire the instruction memory address information IST_ADDI. The instruction fetch logic 233 may acquire address information for accessing the instruction set region IST_R of the instruction memory 231 from the instruction memory address information IST_ADDI.

The address information for accessing the instruction set region IST_R may comprise a start address IST_ADD of the instruction set region IST_R storing the instruction set IST_SET to be fetched in whole or in part, and an instruction count IST_CNT representing a number of the instructions starting from the start address IST_ADD to be fetched.

The instruction memory address information IST_ADDI may be one of a single index type and a multi index type. The instruction fetch logic 233 may directly acquire the address information (the start address IST_ADD and the instruction count IST_CNT) for accessing the instruction set region IST_R from the single index type of the instruction memory address information IST_ADDI. The direct acquisition method will be described in detail with reference to FIGS. 9 to 12. The instruction fetch logic 233 may indirectly acquire the address information (the start address IST_ADD and the instruction count IST_CNT) for accessing the instruction set region IST_R from the multi index type of the instruction memory address information IST_ADDI. The indirect acquisition method will be described in detail with reference to FIGS. 13 and 14.

The instruction fetch memory 233 may access the instruction set region IST_R of the instruction memory 231 through the instruction memory address IST_ADD and the instruction count IST_CNT, which are acquired through the instruction memory address information IST_ADDI, and may fetch the instruction set IST_SET in whole or in part. The instruction fetch logic 233 may store the fetched instruction set IST_SET in the instruction buffer memory 235.

The memory instruction generation block 250 may generate the memory instruction by combining particular values of the descriptor parameter DSC_PRM (i.e., particular values of the address ADDR, the data size SZ, and the delay time T) in the descriptor DSC stored in the descriptor buffer memory 215 to the instruction set IST_SET stored in the instruction buffer memory 235, as illustrated in FIG. 6.

The memory instruction generation block 250 may provide the memory instruction to the memory instruction generation block 250 in order for the signal generation unit 300 to generate the control signal to be provided to the nonvolatile memory device 110.

The memory instruction generation block 250 may request the DMA block 270 to provide write data DT stored in the data buffer region of the volatile memory 150 to the signal generation unit 300 during the write operation, and may request the DMA block 270 to store read data DT read out from the nonvolatile memory device 110 in the data buffer region of the volatile memory 150 during the read operation. For this, the memory instruction generation block 250 may provide the data buffer memory address DT_ADD for the write/read data DT, which is one of the descriptor parameter DSC_PRM, to the DMA block 270.

The memory instruction generation block 250 may receive status information STTS of the nonvolatile memory device 110 from the signal generation unit 300 as the processing result of the descriptor DSC. The status information STTS may indicate whether an operation in response to the control signal is ongoing, and whether a completed operation in response to the control signal is passed or failed. The memory instruction generation block 250 may provide the descriptor address DSC_ADD and the status information STTS to the DMA block 270 so that the status information STTS is stored in the status information STTS field of the descriptor DSC stored in the volatile memory 150.

FIG. 9 is a schematic diagram exemplarily illustrating the single index type of the instruction memory address information IST_ADDI according to an exemplary embodiment.

Referring to FIG. 9, the single index type of the instruction memory address information IST_ADDI may comprise a "Type" field in which information S representing the single index type, an "Address" field representing the start address IST_ADD, and a "Count" field representing the instruction count IST_CNT.

Figure 11:
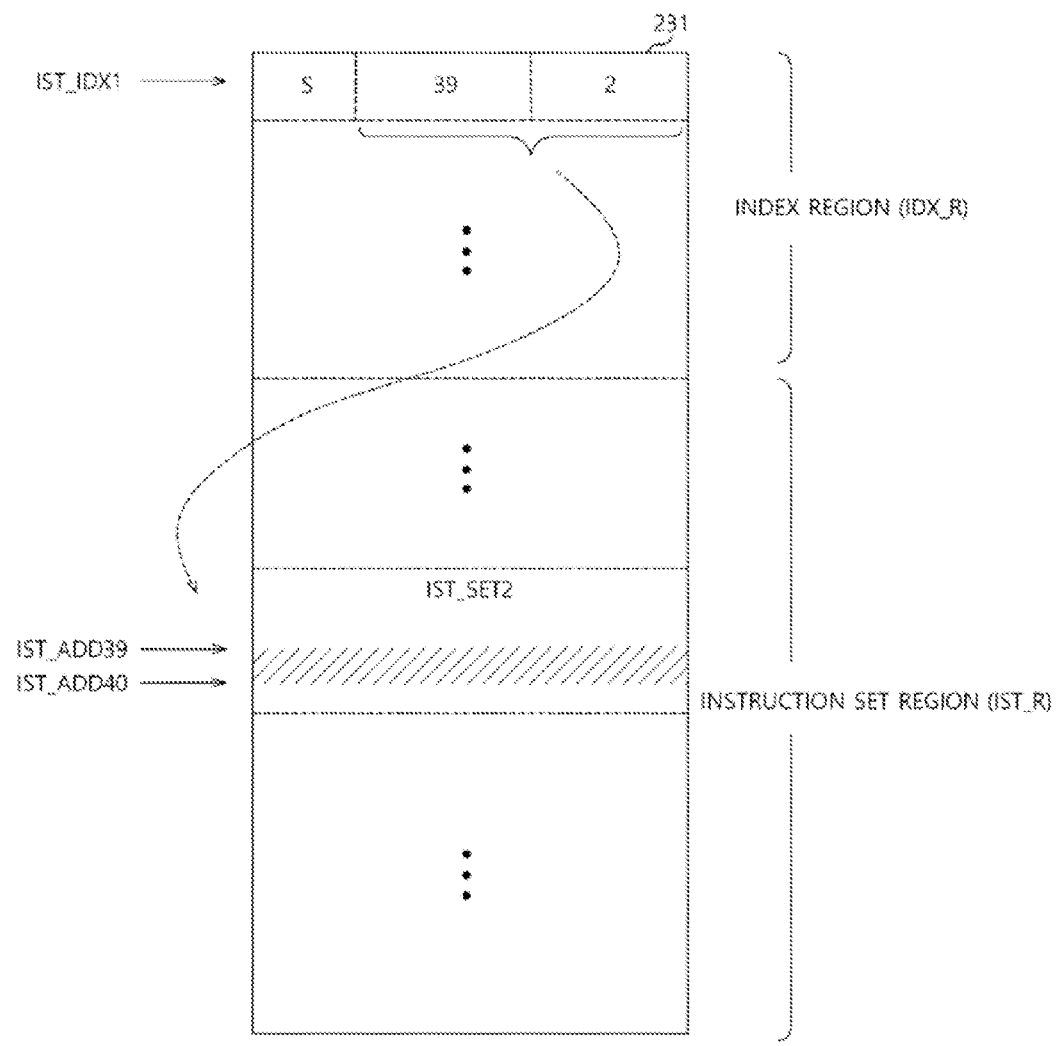

FIGS. 10 to 12 are schematic diagrams illustrating a method of directly acquiring the address information (the start address IST_ADD and the instruction count IST_CNT) for accessing the instruction set region IST_R using the single index type of the instruction memory address information IST_ADDI. For clarity, the description hereinafter will be made with an example in which the instruction fetch logic 233 refers to the instruction memory index IST_IDX1 from the descriptor DSC.

Referring to FIG. 10, the instruction fetch logic 233 may acquire the instruction memory address information IST_ADDI by accessing the index region IDX_R corresponding to the instruction memory index IST_IDX1 in the instruction memory 231. The instruction fetch logic 233 may identify the instruction memory address information IST_ADDI as the single index type from the information S of the "Type" field, and acquire the start address IST_ADD (for example, the start address "33" of the instruction set 2 IST_SET2 as shown in FIG. 10) and the instruction count IST_CNT (for example, the instruction count "6" as shown in FIG. 10) from the "Address" and "Count" fields.

For example, the instruction fetch logic 233 may access the instruction set region IST_R of the instruction memory addresses IST_ADD33 to IST_ADD38, which correspond to the start address "33" and the instruction count "6" as shown in FIG. 10. As an access result, the instruction fetch logic 233 may fetch the instructions constituting the instruction set 2 IST_SET2 (a hatched region of FIG. 10). For example, the fetched instructions of the hatched region may be the operation code 1 representing the read command code 1, and the five operation codes "n+1" representing the address ADDR shown in FIG. 6.

Referring to FIG. 11, the instruction fetch logic 233 may acquire the instruction memory address information IST_ADDI by accessing the index region IDX_R corresponding to the instruction memory index IST_IDX1 in the instruction memory 231. The instruction fetch logic 233 may identify the instruction memory address information IST_ADDI as the single index type of the information S of the "Type" field, and acquire the start address IST_ADD (for example, the start address "39" of the instruction set 2 IST_SET2 as shown in FIG. 11) and the instruction count IST_CNT (for example, the instruction count "2" as shown in FIG. 11) of the "Address" and "Count" fields.

For example, the instruction fetch logic 233 may access the instruction set region IST_R of the instruction memory addresses IST_ADD39 to IST_ADD40, which correspond to the start address "39" and the instruction count "2" as shown in FIG. 11. As an access result, the instruction fetch logic 233 may fetch the instructions constituting the instruction set 2 IST_SET2 (a hatched region of FIG. 11). For example, the fetched instructions of the hatched region may be the operation code 2 representing the read command code 2, and the operation code "n+4" representing the delay time T shown in FIG. 6.

Referring to FIG. 12, the instruction fetch logic 233 may acquire the instruction memory address information IST_ADDI by accessing the index region IDX_R corresponding to the instruction memory index IST_IDX1 in the instruction memory 231. The instruction fetch logic 233 may identify the instruction memory address information IST_ADDI as the single index type of the information S of the "Type" field, and acquire the start address IST_ADD (for example, the start address "33" of the instruction set 2 IST_SET2 as shown in FIG. 12) and the instruction count IST_CNT (for example, the instruction count "9" as shown in FIG. 12) of the "Address" and "Count" fields.

For example, the instruction fetch logic 233 may access the instruction set region IST_R of the instruction memory addresses IST_ADD33 to IST_ADD41, which correspond to the start address "33" and the instruction count "9" as shown in FIG. 12. As an access result, the instruction fetch logic 233 may fetch all the instructions constituting the instruction set 2 IST_SET2 (a hatched region of FIG. 12). For example, the fetched instructions of the hatched region may be the operation code 1 representing the read command code 1, the five operation codes "n+1" representing the address ADDR, the operation code 2 representing the read command code 2, and the operation code "n+4" representing the delay time T shown in FIG. 6.

FIG. 13 is a schematic diagram illustrating the multi index type of the instruction memory address information IST_ADDI according to an exemplary embodiment.

Referring to FIG. 13, the multi index type of the instruction memory address information IST_ADDI may comprise a "Type" field in which information M representing the multi index type, a "1st Index" field representing a first index IST_IDX, and a "2nd Index" field representing a second index IST_IDX. FIG. 13 exemplarily shows two "Index" fields, which may vary according to memory design.

Figure 14:
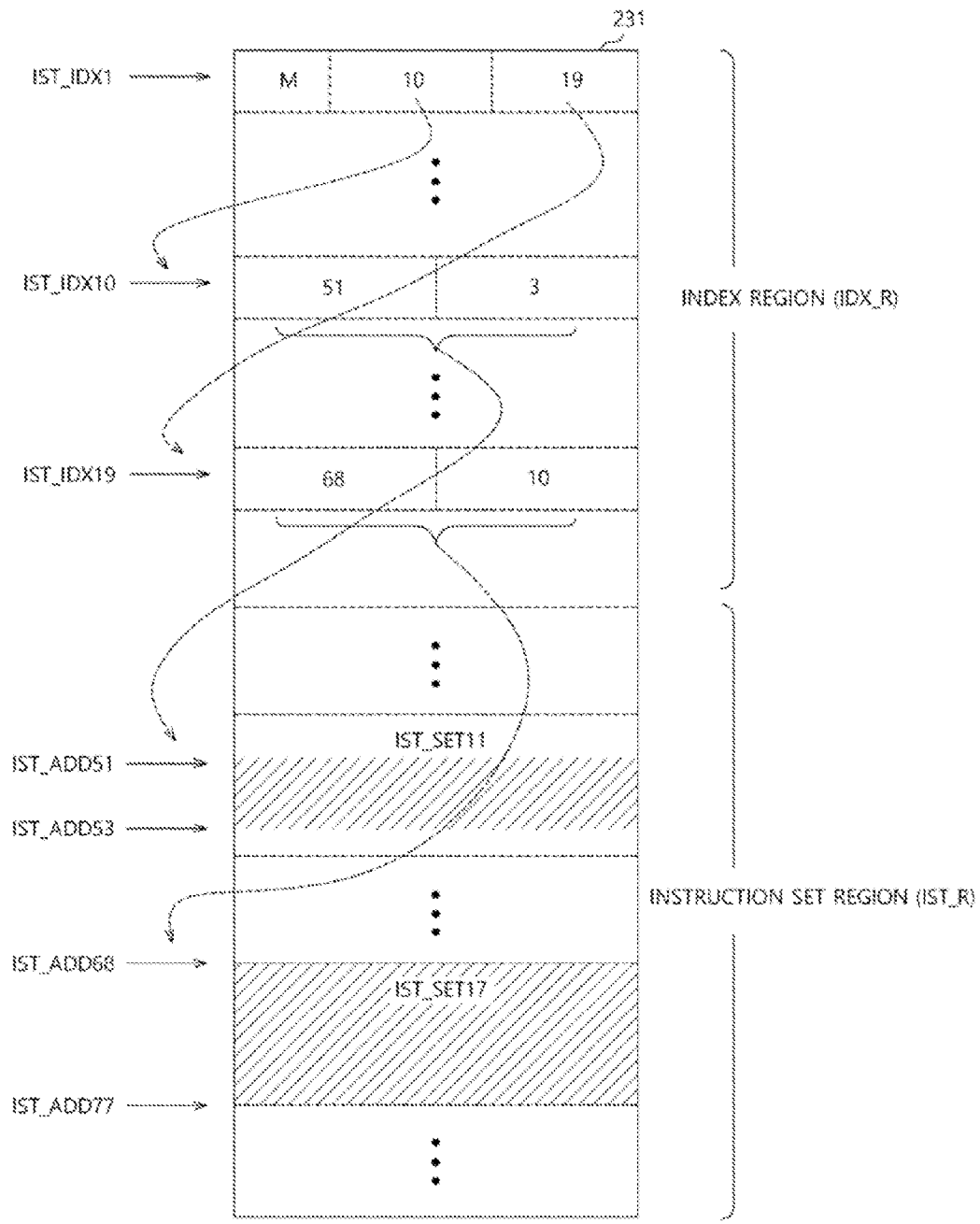
FIG. 14 is a schematic diagram illustrating a method of indirectly acquiring address information according to an embodiment of the inventive concept.

FIG. 14 is a schematic diagram illustrating a method of indirectly acquiring address information (the start address IST_ADD and the instruction count IST_CNT) for accessing the instruction set region IST_R using the multi index type of instruction memory address information IST_ADDI. For clarity, the description hereinafter will be made with an example in which the instruction fetch logic 233 refers to the instruction memory index IST_IDX1 from the descriptor DSC.

Referring to FIG. 14, the instruction fetch logic 233 may acquire the instruction memory address information IST_ADDI by accessing the index region IDX_R corresponding to the instruction memory index IST_IDX 1 in the instruction memory 231. The instruction fetch logic 233 may identify the instruction memory address information IST_ADDI as the multi index type from the information S of the "Type" field, and acquire the first index IST_IDX (for example, the first index "10" as shown in FIG. 14) and the second index IST_IDX (for example, the second index "19" as shown in FIG. 14) from the "1st Index" and "2nd index" fields.

For example, an instruction memory index IST_IDX10 and an instruction memory index IST_IDX19 may correspond to the first index "10" and the second index "19", as shown in FIG. 14.

Referring to FIG. 14, the instruction fetch logic 233 may acquire a first instruction memory address information IST_ADDI, which comprises a first "Address" field representing a first start address IST_ADD and a first "Count" field representing a first instruction count IST_CNT, by accessing again the index region IDX_R corresponding to the first index IST_IDX (for example, the first index "10" as shown in FIG. 14) in the instruction memory 231. FIG. 14 exemplarily shows "51" as the first start address IST_ADD, and "3" as the first instruction count IST_CNT.

Also, the instruction fetch logic 233 may acquire a second instruction memory address information IST_ADDI, which comprises a second "Address" field representing a second start address IST_ADD and a second "Count" field representing a second instruction count IST_CNT, by accessing again the index region IDX_R corresponding to the second index IST_IDX (for example, the first index "19" as shown in FIG. 14) in the instruction memory 231. FIG. 14 exemplarily shows "68" as the second start address IST_ADD and "10" as the second instruction count IST_CNT.

For example, the instruction fetch logic 233 may access the instruction set region IST_R of the instruction memory addresses IST_ADD51 to IST_ADD53, which corresponds to the first start address "51" a id the first instruction count "3" as shown in FIG. 14. As an access result, the instruction fetch logic 233 may fetch the instructions constituting an instruction set 11 IST_SET11 (a hatched region of the instruction set 11 IST_SET11).

For example, the instruction fetch logic 233 may access the instruction set region IST_R of the instruction memory addresses IST_ADD68 to IST_ADD77, which corresponds to the second start address "68" and the second instruction count "10" as shown in FIG. 14. As an access result, the instruction fetch logic 233 may fetch the entire instructions constituting an instruction set 17 IST_SET17 (a hatched region of the instruction set 17 IST_SET17).

Figure 15:
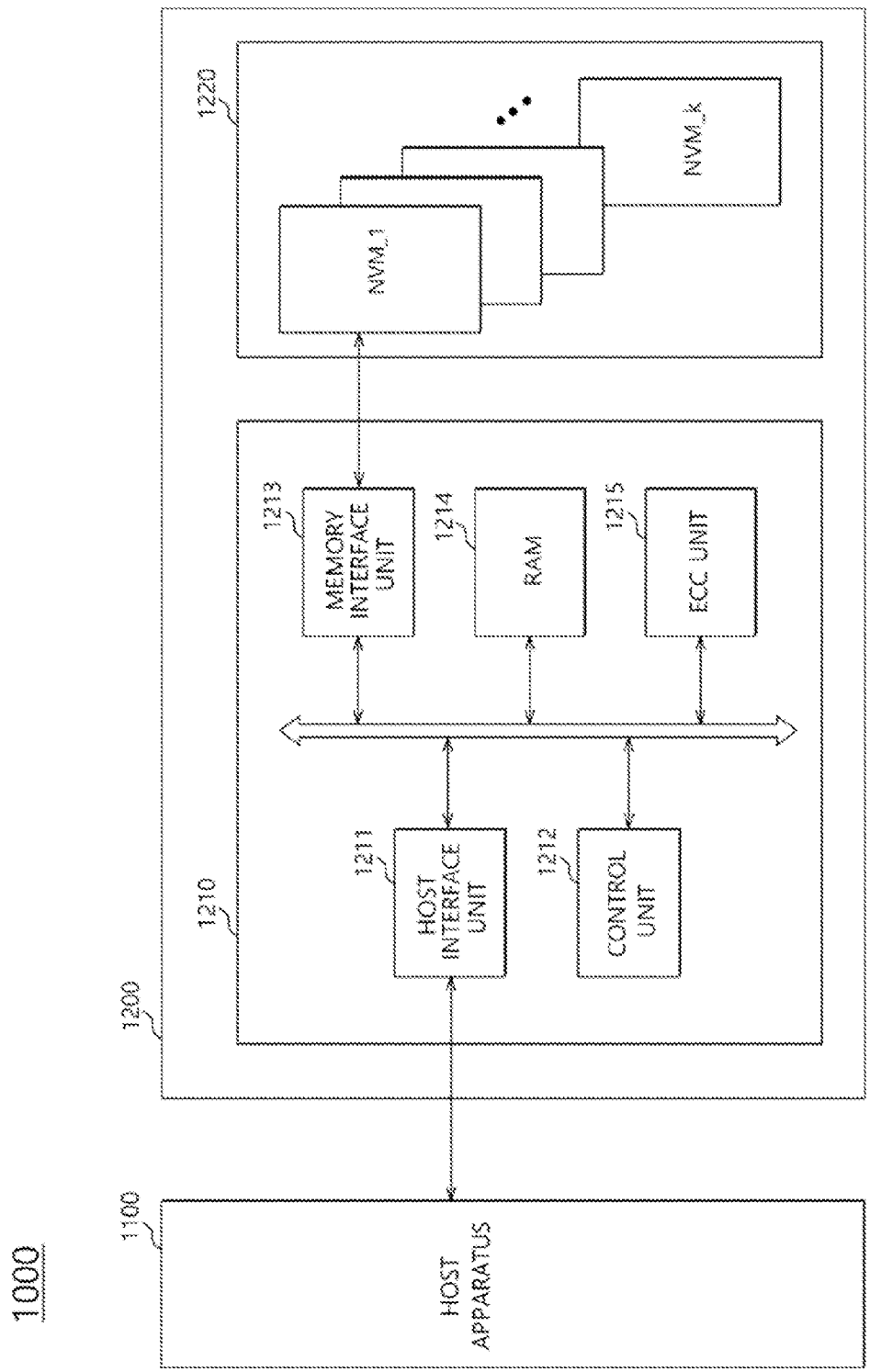
FIG. 15 is a block diagram exemplarily illustrating a data processing system according to an embodiment of the inventive concept.

FIG. 15 is a block diagram exemplarily illustrating a data processing system according to an embodiment. Referring to FIG. 15, a data processing system 1000 may include a host apparatus 1100 and a data storage apparatus 1200.

The data storage apparatus 1200 may include a controller 1210 and a nonvolatile memory device 1220. The data storage apparatus 1200 may be coupled to the host apparatus 1210 such as a portable phone, an MP3 player, a laptop computer, a desk top computer, a game machine, a TV, or an in-vehicle infotainment and used. The data storage apparatus 1200 may refer to a memory system.

The controller 1210 may be suitable for accessing the nonvolatile memory device 1220 in response to a request from the host apparatus 1100. For example, the controller 1210 may be suitable for controlling read, programming, and erase operations of the nonvolatile memory device 1220. The controller 1210 may be suitable for driving firmware or software for controlling the nonvolatile memory device 1220.

The controller 1210 may include a host interface unit 1211, a control unit 1212, a memory interface unit 1213, a RAM 1214, and an ECC unit 1215.

The control unit 1212 may be suitable for controlling overall operation of the controller 1210 in response to a request of the host apparatus 1100. The RAM 1214 may be used as a working memory of the control unit 1212. The RAM 1214 may be used as a buffer memory which temporarily stores data read out from the nonvolatile memory device 1220 or data provided from the host apparatus 1100.

The host interface unit 1211 may be suitable for performing interfacing between the host apparatus 1100 and the controller 1210. For example, the host interface unit 1211 may be suitable for communicating with the host apparatus 1100 through one among various interface protocols such as a USB protocol, a UFS protocol, a MMC protocol, a PCI protocol, a PCI-E protocol, a PATA protocol, a SATA protocol, a SCSI protocol, and a SAS protocol.

The memory interface unit 1213 may be suitable for performing interfacing between the controller 1210 and the nonvolatile memory device 1220. The memory interface unit 1213 may be suitable for providing a command and an address to the nonvolatile memory device 1220. The memory interface unit 1213 may be suitable for exchanging data with the nonvolatile memory device 1220.

As described with reference to FIGS. 2 to 14, the memory interface unit 1213 may constitute an instruction set by combining the instructions defined in the instruction table, fetch the instruction set in an index manner, generate a memory instruction by adding additional information required to perform the instruction based on the descriptor parameter, and generate a control signal to be provided to the nonvolatile memory device 1220 based on the memory instruction.

The ECC unit 1215 may be suitable for detecting an error of data read out from the nonvolatile memory device 1220. The ECC unit 1215 may be suitable for correcting the detected error when the detected error is in an error correctable range. The ECC unit 1215 may be included in the inside or outside of the controller 1210 according to the memory system 1000.

The nonvolatile memory device 1220 may be used as a storage medium of the data storage apparatus 1200. The nonvolatile memory device 1220 may include a plurality of nonvolatile memory chips (or dies) NVM_1 to NVM_K.

The controller 1210 and the nonvolatile memory device 1220 may be fabricated with any one among various data storage apparatuses. For example, the controller 1210 and the nonvolatile memory device 1220 may be integrated in a single semiconductor device and may be fabricated with any one among an MMC, eMMC, RS-MMC, or micro-MMC type of MMC, a SD, mini-SD, or micro-SD type of SD card, a USB storage apparatus, a UFS apparatus, a PCMCIA card, a CF card, a smart media card, and a memory stick.

Figure 16:
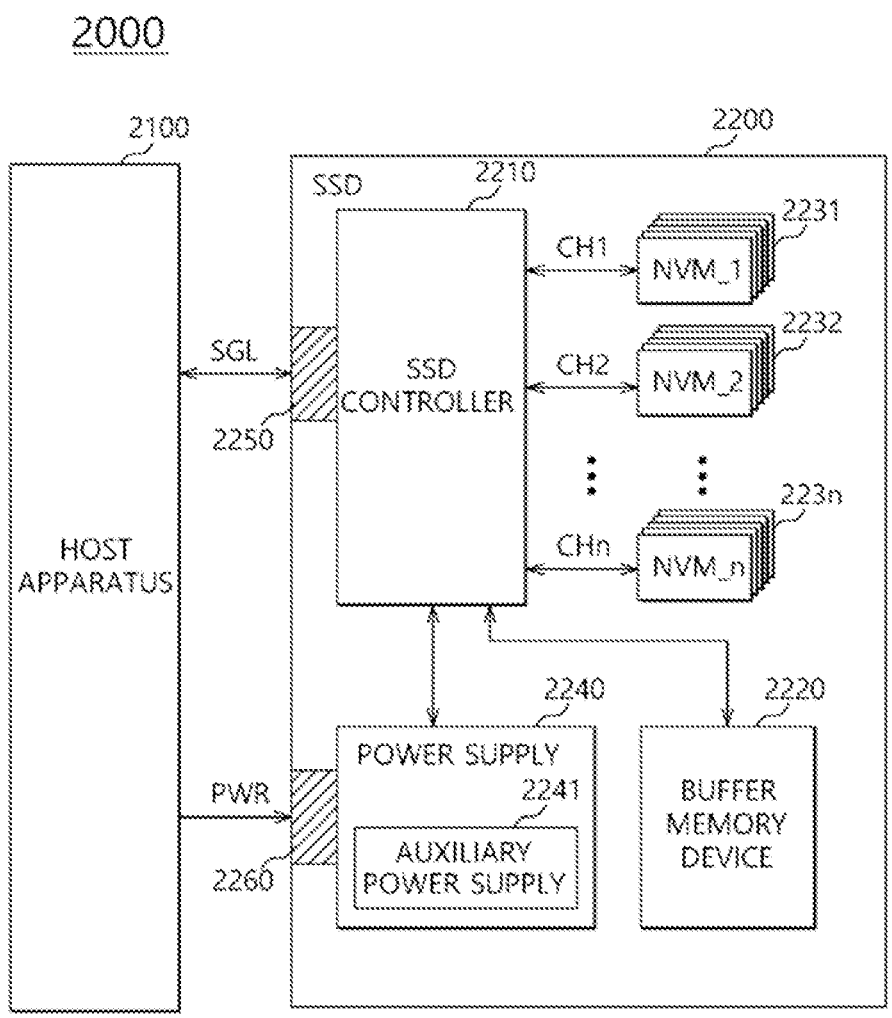
FIG. 16 is a block diagram exemplarily illustrating a data processing system including an SSD according to an embodiment of the inventive concept.

FIG. 16 is a block diagram exemplarily illustrating a data processing system including a solid state drive (SSD) according to an embodiment. Referring to FIG. 16, a data processing system 2000 may include a host apparatus 2100 and an SSD 2200.

The SSD 2200 may include an SSD controller 2210, a buffer memory device 2220, nonvolatile memory devices 2231 to 223n, a power supply 2240, a signal connector 2250, and a power connector 2260.

The SSD 2200 may be operated in response to a request of the host apparatus 2100. That is, the SSD controller 2210 may be suitable for accessing the nonvolatile memory devices 2231 to 223n in response to a request of the host apparatus 2100. For example, the SSD controller 2210 may be suitable for controlling read, programming, and erase operations of the nonvolatile memory devices 2231 to 223n.

The buffer memory device 2220 may be suitable for temporarily storing data to be stored in the nonvolatile memory devices 2231 to 223n. The buffer memory devices 2220 may be suitable for temporarily storing data read out from the nonvolatile memory devices 2231 to 223n. The data temporarily stored in the buffer memory device 2220 may be transmitted to the host apparatus 2100 or the nonvolatile memory devices 2231 to 223n according to control of the SSD controller 2210.

The nonvolatile memory devices 2231 to 223n may be used as storage media of the SSD 2200. The nonvolatile memory devices 2231 to 223n may be coupled to the SSD controller 2210 through a plurality of channels CH1 to CHn. One or more nonvolatile memory devices may be coupled to one cannel. The nonvolatile memory devices coupled to the one channel may be coupled to the same signal bus and the same data bus.

The power supply 2240 may be suitable for providing power PWR input through the power connector 2260 to the inside of the SSD 2200. The power supply 2240 may include an auxiliary power supply 2241. When there is a sudden power off, the auxiliary power supply 2241 may be suitable for supplying the power so that the SSD 2200 is normally interrupted. The auxiliary power supply 2241 may include super capacitors capable of charging the power PWR.

The SSD controller 2210 may exchange a signal SGL with the host apparatus 2100 through the signal connector 2250. The signal SGL may include a command, an address, data, and the like. The signal connector 2250 may be configured of a connector such as PATA, SATA, SCSI, SAS, PCI, or PCI-E according to an interface method between the host apparatus 2100 and the SSD 2200.

Figure 17:
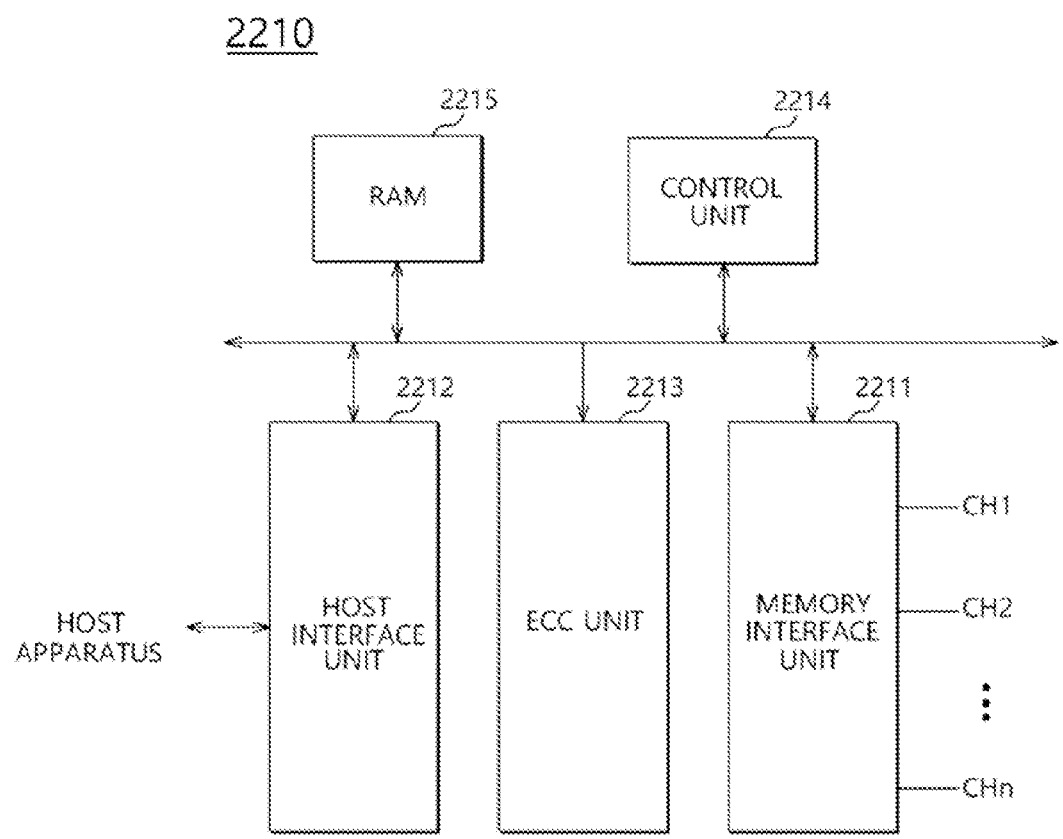
FIG. 17 is a block diagram exemplarily illustrating an SSD controller illustrated in FIG. 16.

FIG. 17 is a block diagram exemplarily illustrating the SSD controller illustrated in FIG. 16. Referring to FIG. 17, the SSD controller 2210 may include a memory interface unit 2211, a host interface unit 2212, an ECC unit 2213, a control unit 2214, and a RAM 2215.

The memory interface unit 2211 may be suitable for providing a control signal such as a command and an address to the nonvolatile memory devices 2231 to 223n. The memory interface unit 2211 may be suitable for exchanging data with the nonvolatile memory devices 2231 to 223n. The memory interface unit 2211 may perform scattering on the data transmitted from the buffer memory device 2220 to the channels CH1 to CHn according to control of the control unit 2214. The memory interface unit 2211 may transfer the data read out from the nonvolatile memory device 2231 to 223n to the buffer memory device 2220 according to control of the control unit 2214.

As described with reference to FIGS. 2 to 14, the memory interface unit 2211 may constitute an instruction set by combining the instructions defined in the instruction table, fetch the instruction set in an index manner, generate a memory instruction by adding additional information required to perform the instruction based on the descriptor parameter, and generate a control signal to be provided to the nonvolatile memory devices 2231 to 223n based on the memory instruction.

The host interface unit 2212 may be suitable for performing interfacing with the SSD 2200 according to the protocol of the host apparatus 2100. For example, the host interface unit 2212 may be suitable for communicating with the host apparatus 2100 through any one among a PATA protocol, a SATA protocol, a SCSI protocol, a SAS protocol, a PCI protocol, and a PCI-E protocol. The host interface unit 2212 may perform a disc emulation function supported by the host apparatus 2100 to recognize the SSD 2200 as a hard disc drive (HDD) through the host apparatus 2100.

The ECC unit 2213 may be suitable for generating a parity bit based on data transmitted to the nonvolatile memory devices 2231 to 223n. The generated parity bit may be stored in spare areas of the nonvolatile memory devices 2231 to 223n. The ECC unit 2213 may be suitable for detecting an error of data read out from the nonvolatile memory devices 2231 to 223n. The ECC unit 2213 may be suitable for correcting the detected error when the detected error is in an error correctable range.

The control unit 2214 may be suitable for analyzing and processing the signal SGL input from the host apparatus 2100. The control unit 2214 may control overall operation of the SSD controller 2210 in response to a request of the host apparatus 2100. The control unit 2214 may control the operations of the buffer memory device 2220 and the nonvolatile memory devices 2231 to 223n according to firmware for driving the SSD 2200. The RAM 2215 may be used as a working memory for driving the firmware.

Figure 18:
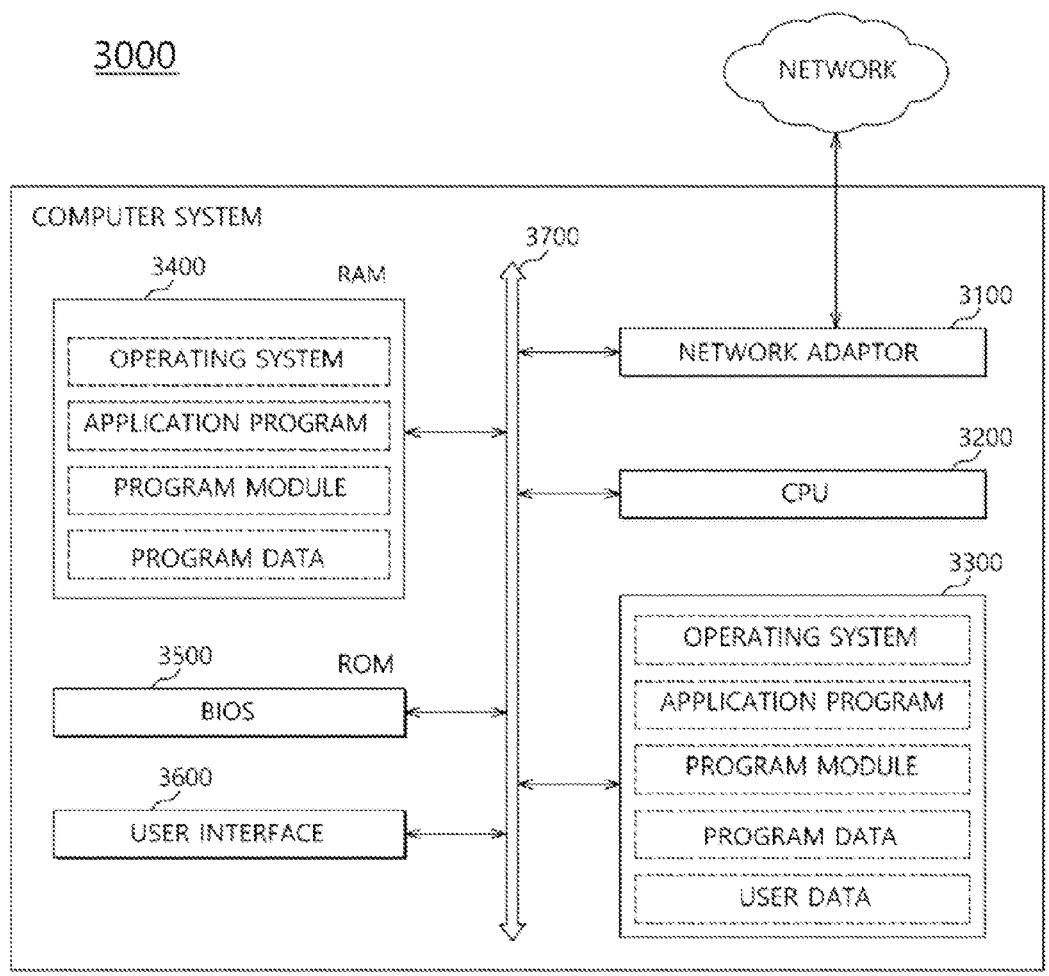
FIG. 18 is a block diagram exemplarily illustrating a computer system equipped with a data storage apparatus according to an embodiment of the inventive concept.

FIG. 18 is a block diagram exemplarily illustrating a computer system mounted with a data storage apparatus according to an embodiment. Referring to FIG. 18, a computer system 3000 may include a network adaptor 3100, a central processing unit (CPU) 3200, a data storage apparatus 3300, a RAM 3400, a read only memory (ROM) 3500, and a user interface 3600 which are electrically coupled to a system bus 3700. The data storage apparatus 3300 may be configured of the data storage apparatus 100 illustrated in FIG. 1, the data storage apparatus 1200 illustrated in FIG. 15, and the SSD 2200 illustrated in FIG. 16.

The network adaptor 3100 may provide interfacing between the computer system 3000 and external networks. The CPU 3200 may perform overall operation processing for driving an operating system or application program resided in the RAM 3400.

The data storage apparatus 3300 may store a variety of data required in the computer system 3000. For example, an operating system, application program, various program modules, program data, user data, and the like for driving the computer system 3000 may be stored in the data storage apparatus 3300.

The RAM 3400 may be used as a working memory device of the computer system 3000. The operating system, application program, various program modules read out from the data storage apparatus 3300 and program data required for driving of programs may be loaded into the RAM 3400 in booting. A basic input/output system (BIOS) which is activated before the operating system is driven may be stored in the ROM 3500. Information exchange between the computer system 3000 and the user may be performed through the user interface 3600.

Although not shown in FIG. 18, the computer system 3000 may further include apparatuses such as a battery, an application chipset, and a camera image processor (CIS).

The above embodiments of the present invention are illustrative and not limitative. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A memory control unit comprising:
   a descriptor fetch block configured to fetch a descriptor, which describes a work for controlling a nonvolatile memory device, from a volatile memory;
   an instruction fetch block configured to fetch an instruction set from an instruction memory through an address information, wherein the instruction fetch block obtains the address information from the instruction memory through an index information included in the fetched descriptor;
   a memory instruction generation block configured to generate a memory instruction by combining a descriptor parameter value included in the fetched descriptor with the fetched instruction set; and
   a direct memory access (DMA) block configured to directly access the volatile memory,
   wherein the descriptor fetch block includes:
      a descriptor queue configured to store an identification (ID) of the descriptor; and
      a descriptor fetch logic configured to fetch the ID of the descriptor from the descriptor queue, obtain a descriptor address of the volatile memory from the fetched ID of the descriptor, and request the DMA block to read out the descriptor corresponding to the obtained descriptor address from the volatile memory.

2. The memory control unit of claim 1, wherein the instruction memory includes an index region storing the address information, and an instruction set region storing the instruction set.

3. The memory control unit of claim 2,
wherein the address information includes a start address and a count value for the instruction set within the instruction set region, and
wherein the instruction fetch block fetches one or more instructions corresponding to the address information within the instruction set.

4. The memory control unit of claim 3, wherein the instruction fetch block includes an instruction fetch logic configured to fetch the instruction set in whole or in part according to the address information.

5. The memory control unit of claim 4, wherein the instruction fetch block further includes an instruction buffer memory configured to store the fetched instruction set.

6. The memory control unit of claim 2,
wherein the address information includes:
a first address information comprising a plurality of index address information; and
a plurality of second address information each comprising a start address and a count value for the instruction set within the instruction set region,
wherein the first address information are indicated by the index information, and
wherein the plurality of second address information are indicated by the plurality of index address information of the first address information, respectively.

7. The memory control unit of claim 6,
wherein the instruction fetch block obtains the plurality of second address information from the index region through the index information and the first address information, and
wherein the instruction fetch block fetches one or more instructions corresponding to the plurality of second address information within the instruction set.

8. The memory control unit of claim 1, wherein the descriptor fetch block further includes a descriptor buffer memory configured to store the descriptor provided from the DMA block.

9. The memory control unit of claim 1, further comprising a signal generation unit configured to generate a control signal to be provided to the nonvolatile memory device in response to the memory instruction.

10. A data storage apparatus comprising:
a nonvolatile memory device;
a control unit configured to generate a descriptor, which describes a work for controlling the nonvolatile memory device, and storing the descriptor in a volatile memory; and
a memory control unit including an instruction memory storing an instruction set, and configured to obtain an address information, which corresponds to an instruction set to be fetched from the instruction memory, from the instruction memory through an index information included in the descriptor,
wherein the address information includes:
a first address information comprising a plurality of index address information; and
a plurality of second address information each comprising a start address and a count value for the instruction set within an instruction set region of the instruction memory,
wherein the first address information are indicated by the index information, and
wherein the plurality of second address information are indicated by the plurality of index address information of the first address information, respectively.

11. The data storage apparatus of claim 10,
wherein the memory control unit includes an instruction fetch block configured to obtain the address information from an index region of the instruction memory through the index information,
wherein the address information includes a start address and a count value for the instruction set within an the instruction set region of the instruction memory, and
wherein the address information corresponds to one or more instructions within the instruction set.

12. The data storage apparatus of claim 11, wherein the instruction fetch block includes an instruction fetch logic configured to fetch the instruction set in whole or in part according to the address information.

13. The data storage apparatus of claim 12, wherein the instruction fetch block further includes an instruction buffer memory configured to store the fetched instruction set.

14. The data storage apparatus of claim 10, wherein the memory control unit includes an instruction fetch block configured to:
obtain the plurality of second address information from an index region of the instruction memory through the index information and the first address information, and
fetch one or more instructions corresponding to the plurality of second address information within the instruction set.

15. The data storage apparatus of claim 10, wherein the memory control unit further fetches the descriptor from the volatile memory, and fetches the instruction set in whole or in part according to the address information from the instruction memory.

16. The data storage apparatus of claim 15, wherein the memory control unit further generates a memory instruction by combining a descriptor parameter value included in the fetched descriptor to the fetched instruction set.

17. The data storage apparatus of claim 16, wherein the memory control unit further generates a control signal to be provided to the nonvolatile memory device in response to the memory instruction.

* * * * *